United States Patent [19]
Warrender

[11] 3,721,318
[45] March 20, 1973

[54] LIFT TRUCKS

[75] Inventor: John Warrender, Franklin, Coventry, England

[73] Assignee: Total (Power Hydraulics) Limited, Glamorgan, England

[22] Filed: March 19, 1971

[21] Appl. No.: 126,157

[52] U.S. Cl. ................... 187/9, 180/54 R, 180/77 S
[51] Int. Cl. ............................................... B66f 9/06
[58] Field of Search .............. 187/9; 180/77 S, 54 R

[56] References Cited

UNITED STATES PATENTS 2,693,250  11/1954  Barrett ........................... 280/150 E
2,883,774  4/1959  Clifford .............................. 180/50

FOREIGN PATENTS OR APPLICATIONS 923,962  6/1947  France ........................... 180/77 S Primary Examiner—Gerald M. Forlenza
Assistant Examiner—Lawrence J. Oresky
Attorney—Merriam, Marshall, Shapiro & Klose

[57] ABSTRACT

In an industrial lift truck a first assembly comprising a mast structure and driven wheels is detachably mounted on one end of a prime mover, and a second assembly comprising steerable wheels and a counterweight is detachably mounted on the other end of the prime mover. The prime mover thus acts as part of a chassis of the truck. The first assembly comprises a tank which is attached to the prime mover and on which the mast structure and driven wheels are mounted. The tank thus acts as a further part of a chassis. The driven wheels are coupled with the prime mover by an hydrostatic transmission which includes a pump disposed within the tank, the latter acting as a reservoir for the pump.

4 Claims, 2 Drawing Figures

LIFT TRUCKS

SUMMARY OF THE INVENTION

The invention relates to lift trucks of the kind comprising a wheeled structure provided with a prime mover which is coupled to at least one driving wheel, a mast structure being mounted on the wheeled structure and including a power-operated load lifting device movable up and down the mast.

According to the invention we provide a lift truck of the kind referred to wherein the prime mover is mounted directly between a first assembly comprising at least two of the groundengaging wheels and the mast structure, and a second assembly comprising one or more further ground-engaging wheels and a counterbalance weight, the prime mover constituting the sole load-bearing connection between the first assembly and the second assembly.

With this construction the prime mover acts as part of a chassis of the vehicle, no separate chassis being necessary.

The prime mover may from part of a self-contained prime mover assembly comprising parts, such as a cooling radiator, ancillary to the prime mover. In a case where the prime mover is an electric motor, the prime mover assembly would also comprise a battery of electrical cells for supplying energy to the prime mover.

The invention provides the further advantage that it is not necessary to produce a complete range of trucks adapted for specific applications. A variety of each of the assemblies can be manufactured and a truck can be made up to a required specification by fitting together a selection of these assemblies. The number of different trucks which can be produced in this manner is considerably greater than the number of different assemblies which are manufactured.

Preferably the first and second assemblies are detachably mounted on the prime mover.

This construction facilitates maintenance and repair in that any one of the constituent assemblies may readily be removed for reconditioning or replacement and another assembly can be substituted in its place, thus reducing the time a truck is out of service.

Furthermore, modification of a truck is facilitated since one of the constituent assemblies may be substituted by a different assembly having the same functional nature. For example, a truck having a petrol or paraffin engine is not suitable for work in enclosed places and if transferred from, say, an open-stockyard to a warehouse, the prime mover may be changed to a diesel or electric motor thus saving the expense of replacing the entire truck.

DETAILED DESCRIPTION

Figure 1:
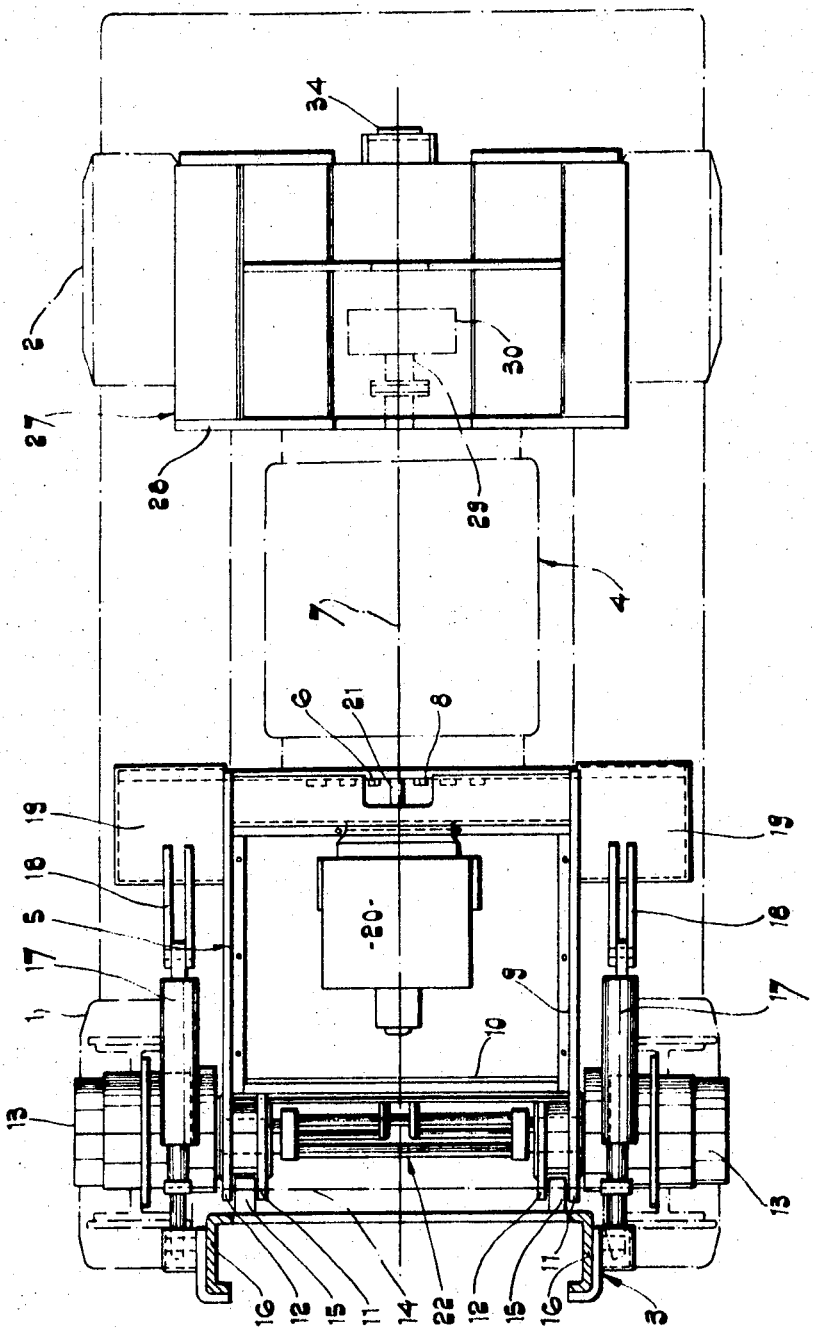
FIG. 1 shows a plan view of a truck according to the invention, the mast structure being shown in transverse cross-section and certain parts of the bodywork and the counterweight being omitted for clarity.
Figure 2:
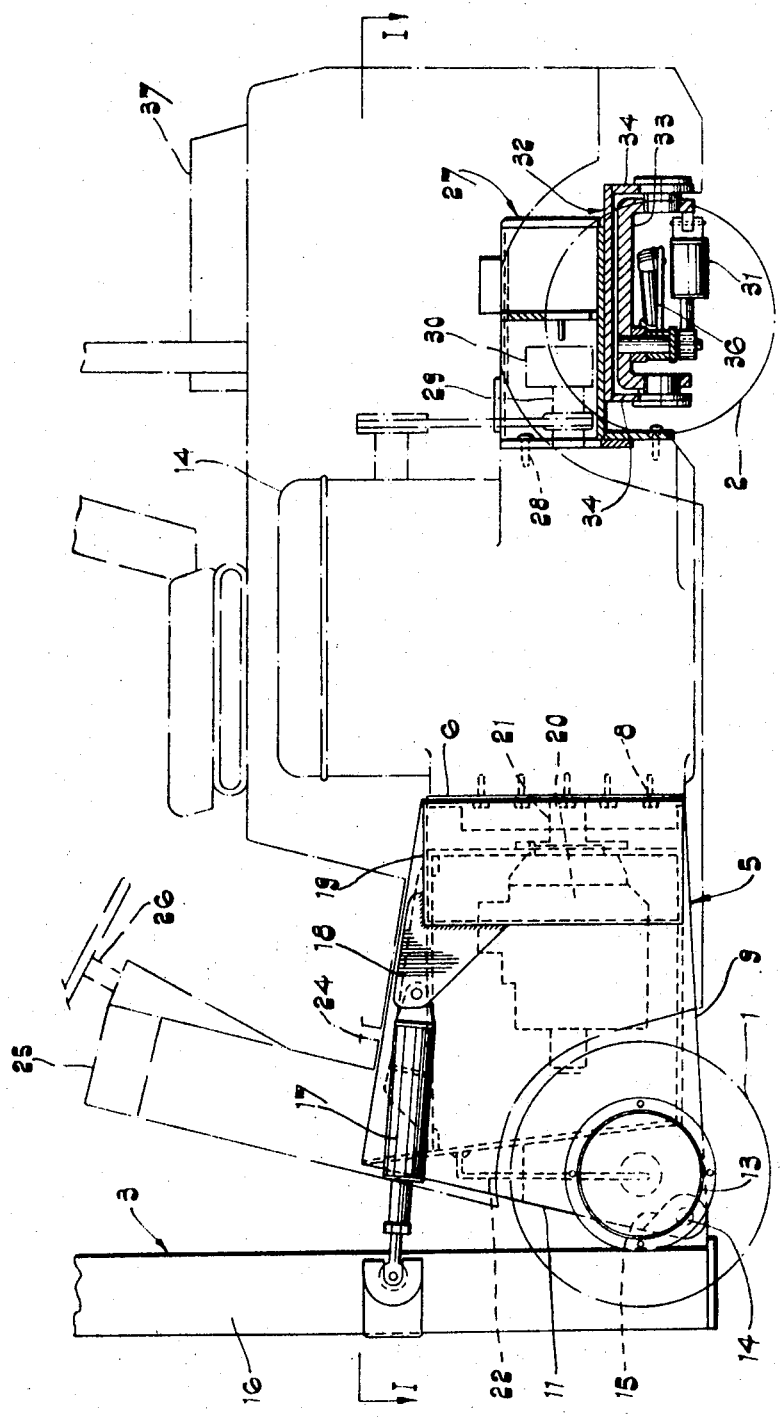
FIG. 2 is a view in side elevation of the truck shown in FIG. 1, a rear part being shown in section on the longitudinal center line of the truck and certain parts at the top of the truck being broken away.

The truck includes a pair of front ground-engaging wheels 1, a pair of rear ground-engaging wheels 2, a mast assembly 3 and a prime mover 4. The mast structure and front wheels form part of a first assembly which further includes a tank 5 and this first assembly is detachably mounted on the front end of the prime mover. A second assembly which includes the rear wheels is detachably mounted on the rear end of the prime mover.

The tank 5 is provided at its rearward end with an extension which includes a flange 6 lying in a plane which extends transversely of the truck. The flange defines a generally circular aperture, the center of which lies on a fore and aft axis 7 of the truck. A series of holes are formed in the flange at positions spaced somewhat radially outwardly from the boundary of the aperture for receiving bolts 8 by means of which the tank is detachably secured to the prime mover. Access is obtained to the heads of the bolts through openings at the top and bottom of the extension.

Side walls 9 of the tank 5 extend forwardly beyond the front wall 10 of the tank to provide mounting brackets 11. A further mounting bracket 12 is attached to the front wall 10 adjacent to each of the brackets 11, the brackets 12 extending forwardly from the front wall parallel to the brackets 11 and spaced a short distance inwardly therefrom. The brackets 11 and 12 are formed with apertures within which are secured a pair of hydraulic motors 13, one for each of the front wheels 1. The part of each hydraulic motor which is mounted in the brackets 11 and 12 is a stationary part, and the motors include rotatable parts on which the front wheels are mounted.

The brackets 11 and 12 are each formed with a further aperture by means of which the mast structure 3 can be mounted on the tank 5 for pivoting movement relative thereto about a transverse tilt axis 14. The mast structure is provided with a pair of apertured lugs 15, each of which extends between the bracket 11 and the bracket 12 at one side of the truck, a pin at each side of the truck extending through the apertures in the brackets and associated lug.

The mast structure 3 includes a pair of upright channel section members 16 which provide a trackway along which a load lifting device such as a fork lift carriage, can move upwardly and downwardly. The mast structure may include two or more telescopic sections and an hydraulic ram for moving the load lifting means upwardly and downwardly.

An hydraulic tilt ram 17 is provided at each side of the truck for controlling tilting movement of the mast structure about the axis 14. One end of each of the rams 17 is pivotally mounted on the adjacent channel section member 16 at a position spaced some distance above the axis 14, and the other end of each ram is pivotally connected with a bracket 18 provided on a box structure 19 which is welded to the side wall 9 of the tank.

Within the tank 5 there is disposed an hydraulic pump 20 of the variable displacement swash plate type. The pump is drivingly connected with the prime mover by means of a drive shaft 21 which extends along the axis 7 of the truck. The tank 5 acts as an hydraulic reservoir for the pump 20 from which the latter draws hydraulic fluid. Ducts 22 are provided for conveying fluid from the pump to the wheel motors 13 and for returning fluid from the motors to the tank.

A foot-operated control 24 for the pump 20 is mounted on an upper wall 23 of the tank 5 and hand controls for the lift and tilt rams are provided on a pillar 25 which extends upwardly from the tank at the forward end thereof. A steering column 26 is also mounted in the pillar 25.

The prime mover 4 may be an internal combustion engine of known construction, for example a diesel engine or a spark ignition engine. The flange 6 of the tank extension is bolted to a flywheel casing of the prime mover in a manner similar to that in which a clutch bell housing is bolted to the flywheel casing in vehicles with a mechanical transmission. The flywheel casing and sump of the internal combustion engine are suitably strengthened to enable the prime mover to bear the bending stress which is applied by the first and second assemblies. It will be noted that the tank 5 and the prime mover act as part of a chassis of the truck.

In a case where the prime mover 4 is an electric motor, the latter would be provided with a suitably strengthened casing or with an external framework to act as part of a chassis of the truck. Such casing or framework would be formed to co-operate with the flange 6 and to be secured thereto by the bolts 8. Thus, a variety of prime mover assemblies may be attached to the first assembly.

In a case where the prime mover is an electric motor, the prime mover assembly would also include a battery of electrical cells for providing the motor with current, such battery being conveniently mounted above the motor.

The second assembly comprises a sub-frame 27 which is detachably mounted on the end of the prime mover assembly remote from the tank 5. The sub-frame includes an end member 28 which is bolted to an end face of the prime mover, the end member being formed with an aperture or slot to accommodate a power take-off shaft 29 which extends from the prime mover.

A service pump 30 is located within the sub-frame 27 and is drivingly connected with the power take-off shaft 29. The service pump supplies hydraulic fluid for operation of the tilt and lift rams and also for operation of hydraulic steering rams 31.

The second assembly further comprises a mounting bracket 32 for a steer axle 33. The mounting bracket includes a plate which is bolted to the underside of the sub-frame 27, and depending lugs 34 at either end of this plate. The lugs carry bearings on which the steer axle is mounted for rocking movement about a fore and aft axis. Such rocking movement is resiliently opposed by rubber stops (not shown) also mounted on the underside of the subframe 27 for engagement with the steer axle.

The rear wheels 2 are mounted on the steer axle 32 for steering movement about respective substantially upright axes. Steering movement of the rear wheels is controlled by the steering rams 31 which act between the steer axle and a lever mounted thereon for pivoting movement in a horizontal plane. The lever is connected with both of the rear wheels by respective links 36.

The second assembly further comprises a counterweight 37 (not shown in FIG. 1) which is mounted on top of the sub-frame 27. In a case where the prime mover is an internal combustion engine a water-cooling radiator is mounted at the rear end of the engine and passages are formed in the counterweight to permit air to pass through the radiator.

The number of ground-engaging wheels on the vehicle may be varied as required. Thus, a pair of front wheels and a single rear wheel may be provided. It will be appreciated that a single hydraulic motor may be provided for driving both of the frong wheels, or for driving the rear wheel only.

I claim:
1. In a lift truck comprising:
    a. a prime mover,
    b. at least three ground-engaging wheels, at least one of which is coupled with the prime mover to be driven thereby, and
    c. a mast structure including a load-lifting means also arranged to be driven from the prime mover,
    the improvement wherein the prime mover is mounted directly between
    d. a first assembly which comprises the mast structure and at least two of said wheels, and which is attached to one end of the prime mover, said first assembly including a tank adapted to act as a reservoir for hydraulic fluid and formed with:
        i. means for attaching the tank to the prime mover,
        ii. mounting means for the mast structure, and
        iii. mounting means for the wheels comprised by the first assembly, whereby the tank acts also as a part of a chassis of the truck, and
    e. a second assembly which comprises the remainder of the wheels and a counterbalance weight, and which is attached to the other end of the prime mover, the prime mover constituting the sole load-bearing connection between the first assembly and the second assembly.

2. A lift truck according to claim 1 wherein the first assembly further comprises:
    a. at least one hydraulic motor drivingly coupled with said wheels comprised by the first assembly, and
    b. an hydraulic pump disposed within said tank and arranged for supplying fluid from the tank to said hydraulic motor.

3. A lift truck according to claim 2 wherein:
    a. the second assembly comprises a sub-frame attached to the prime mover,
    b. the, or each, wheel comprised by the rear assembly is mounted on the sub-frame for steering movement relative thereto about a generally upright axis, and
    c. the counterbalance weight is secured to the sub-frame.

4. A lift truck according to claim 1 wherein the first and second assemblies are detachably mounted on the prime mover.

* * * * *